Feb. 5, 1924.
W. J. TIDEMAN
ADJUSTABLE CASTER
Filed Dec. 10, 1921

1,482,954

Inventor
William J. Tideman

By Freare and Bond
Attorney

Patented Feb. 5, 1924.

1,482,954

UNITED STATES PATENT OFFICE.

WILLIAM J. TIDEMAN, OF CANTON, OHIO, ASSIGNOR TO THE UNITED ELECTRIC COMPANY, OF CANTON, OHIO, A CORPORATION.

ADJUSTABLE CASTER.

Application filed December 10, 1921. Serial No. 521,341.

*To all whom it may concern:*

Be it known that I, WILLIAM J. TIDEMAN, a citizen of the United States, residing at Canton, in the county of Stark and State of Ohio, have invented a new and useful Improvement in Adjustable Casters, of which the following is a specification.

This invention relates to a caster for the rear end of a portable vacuum cleaner or similar use, wherein it is desirable to adjust the caster vertically with reference to the machine, to tilt the same upward or downward upon its forward wheels, and wherein the vibration of the machine tends to change the adjustment; and the objects of the improvement are to provide simple means for adjusting such a caster to a plurality of positions and for stopping or holding it in the various positions.

The above and other objects may be attained by providing a grooved shank upon the bracket carrying the caster and slidably mounting the same within a socket formed in the machine, friction means being provided for engaging any of the grooves in said shank, and positive means, such as a screw, being provided for engagement with the grooved shank for locking the same in any desired vertical adjustment and at the same time permitting the shank to rotate freely.

An embodiment of the invention thus set forth in general terms is illustrated in the accompanying drawing, in which—

Figure 1:
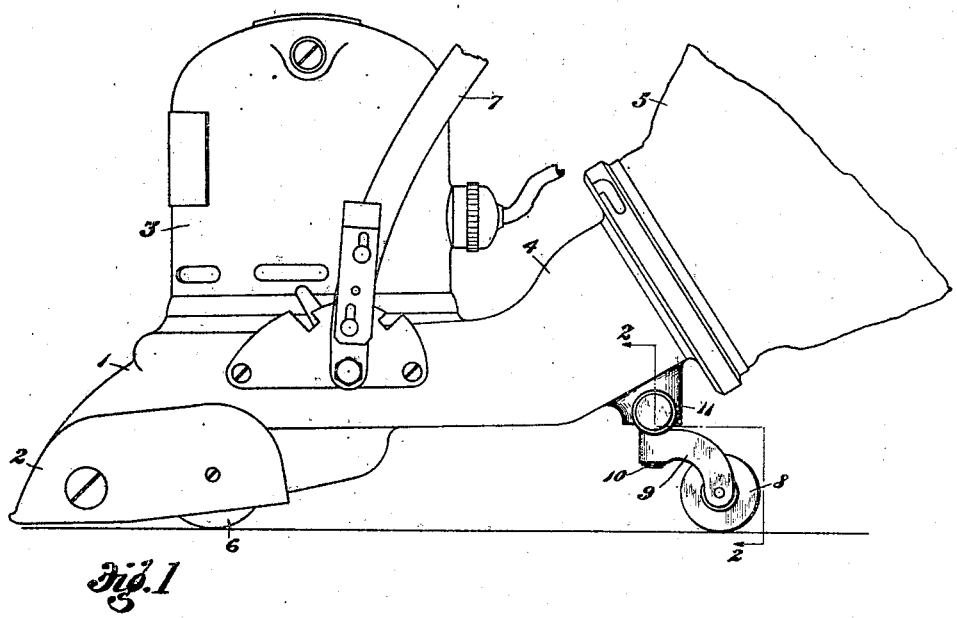
Figure 2:
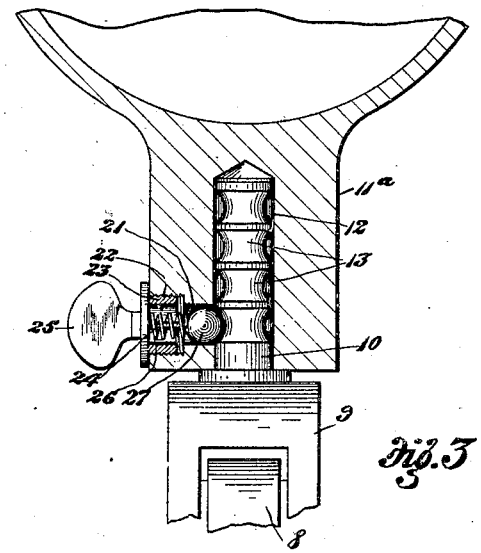

Figure 1 is a side elevation of a portable vacuum cleaner showing the improved caster thereon;

Fig. 2, a section on the line 2—2, Fig. 1; and

Figure 3:

Fig. 3, a view similar to Fig. 2, showing a modification of the invention.

Similar numerals of reference indicate corresponding parts throughout the drawing.

The suction cleaner illustrated includes the fan casing 1 provided upon its forward side with the suction nozzle 2, on top with the motor casing 3 and in the rear with the discharge outlet 4 leading to the dust collecting bag 5, the nozzle portion of the machine being usually supported upon the wheels 6; and on each side of the casing is pivoted a handle bail 7, by means of which the machine is manipulated.

The machine being supported at its forward end upon the wheels 6, the same can be tilted upward or downward by lowering or raising the rear end thereof; and for the purpose of limiting the downward movement, a rear caster 8 is usually provided. By making this rear caster adjustable vertically, with reference to the rear end of the machine, the normal position of the nozzle with reference to the floor or carpet, can be varied.

For the purpose of the present invention, the rear caster 8 is preferably journaled within the bifurcated bracket 9 which is preferably swiveled upon the lower end of the shank 10. The rear portion of the casing may be provided with the depending boss 11 having the vertical bore or socket 12 open through the lower end thereof and arranged to receive the shank 10 which is provided with a plurality of annular grooves 13.

As shown in Fig. 2, a boss 11 may be provided near its lower end with the transverse bore 14 within which is mounted the bearing ball 15, normally urged inwardly into position to engage the adjacent groove 13 by means of the spring 16, a threaded plug 17 closing the outer end of the bore and retaining the spring therein.

As the shank 10 is moved vertically within the socket 12, it will be seen that each groove 13 will be frictionally engaged by the ball 15 as it is brought into proximity thereto. For the purpose of locking the shank in any vertical adjustment to which it is moved, a bearing screw 18 may be threaded through the tapped bore 19 aligned with the bore 14, said screw being provided with the rounded inner end 20 for engagement with any of the grooves 13.

By turning the screw 18 until the end of the same is moved out of engagement with the shank, it will be possible to raise or lower the shank within the socket 12, the ball 15 successively engaging each groove 13 of the shank as the same are moved into position to register with the ball, frictionally holding the shank in any of the provided adjustments. The screw 18 is then tightened engaging the adjacent groove of the shank and locking the shank against vertical movement with reference to the boss 11, preventing vibrations of the machine from changing the adjustment and at the same time permitting the shank to rotate freely, the screw 18 and ball 15, forming a bearing for the shank.

In Fig. 3, is illustrated a slightly modified form of the invention in which the caster and shank are of the same construction as shown in Figs. 1 and 2, the boss 11ᵃ upon the cleaner having only a single bore 21 which is enlarged and tapped as at 22 to receive the tubular screw 23, said screw having a concentric integral pin 24 connected to the head 25 thereof and of greater length than the tubular threaded portion of the screw.

A coil spring 26 is located around the pin 24 between the head 25 of the screw and the ball 27. With the parts in the normal position, the end of the pin 24 engages the ball 27 holding the same in engagement with the adjacent groove 13 of the shank, locking the shank against vertical movement within the boss 11ᵃ. When it is desired to adjust the caster, the screw 23 is loosened, moving the end of the pin 24 out of engagement with the ball 27, the spring 26 urging the ball toward the shank. As the shank is then moved vertically, the ball 27 will successively engage the several grooves 13 of the shank as the same are moved into proximity to the ball.

When the desired adjustment is made, the screw 23 is tightened, the pin 24 again engaging the ball 27 as shown in Fig. 3, holding the same in engagement with the adjacent groove 13 of the shank, preventing vertical movement of the shank and permitting rotation thereof.

By this construction and arrangement, it is evident that the caster bracket with the rear caster thereon, may be adjusted vertically with reference to the vacuum cleaner by merely loosening the locking screw and moving the shank vertically, and that when a particular adjustment is given to the arm and the locking screw tightened, the caster will be held in the adjusted position and will be prevented from being accidentally displaced by vibration of the machine, while at the same time the shank may rotate freely in its bearing, providing a swivelled caster which facilitates turning of the cleaner in any direction.

I claim:—

1. A caster for vacuum cleaners or the like including, a vertically adjustable, annularly grooved shank, a caster carried thereby and a bearing screw for engagement with the shank for holding the same in adjusted positions and friction means cooperating therewith.

2. A caster for vacuum cleaners or the like including, a vertically adjustable, annularly grooved shank, a caster carried thereby, friction means for engaging the grooves of the shank and a bearing screw for engagement with the shank for holding the same in adjusted position.

3. A caster for vacuum cleaners or the like including, a vertically adjustable, grooved shank, a caster carried thereby, a spring pressed ball for engagement with the grooves of the shank and a bearing screw for holding the shank in adjusted positions.

4. A caster for vacuum cleaners or the like including, a vertically adjustable grooved shank, a caster carried thereby, a spring pressed ball for engagement with the grooves and a diametrically opposite bearing screw for engagement with the grooves for holding the shank in adjusted positions.

WILLIAM J. TIDEMAN.